US009183651B2

(12) United States Patent
Hinitz et al.

(10) Patent No.: US 9,183,651 B2
(45) Date of Patent: Nov. 10, 2015

(54) TARGET INDEPENDENT RASTERIZATION

(75) Inventors: Shai Hinitz, Redmond, WA (US); Amar Patel, Kirkland, WA (US); Charles N. Boyd, Woodinville, WA (US); Blake D. Pelton, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 218 days.

(21) Appl. No.: 12/899,125

(22) Filed: Oct. 6, 2010

(65) Prior Publication Data

US 2012/0086715 A1    Apr. 12, 2012

(51) Int. Cl.
*G09G 5/00* (2006.01)
*G09G 5/02* (2006.01)
*G09G 5/39* (2006.01)
*G06T 11/40* (2006.01)

(52) U.S. Cl.
CPC ..................................... *G06T 11/40* (2013.01)

(58) Field of Classification Search
USPC ................................................ 345/613, 522
See application file for complete search history.

(56) References Cited

U.S. PATENT DOCUMENTS

| | | | | |
|---|---|---|---|---|
| 4,918,626 A | * | 4/1990 | Watkins et al. | 345/421 |
| 5,287,438 A | * | 2/1994 | Kelleher | 345/613 |
| 6,005,582 A | * | 12/1999 | Gabriel et al. | 345/586 |
| 6,317,525 B1 | * | 11/2001 | Aleksic et al. | 382/299 |
| 6,501,483 B1 | * | 12/2002 | Wong et al. | 345/611 |
| 6,683,617 B1 | * | 1/2004 | Naoi et al. | 345/613 |
| 6,967,663 B1 | * | 11/2005 | Bastos et al. | 345/613 |
| 7,006,101 B1 | * | 2/2006 | Brown et al. | 345/561 |
| 7,373,485 B2 | | 5/2008 | Ando et al. | |
| 7,375,727 B1 | * | 5/2008 | Greene et al. | 345/422 |
| 7,408,553 B1 | | 8/2008 | Toksvig et al. | |
| 8,115,773 B2 | * | 2/2012 | Swift et al. | 345/522 |
| 2002/0130886 A1 | * | 9/2002 | Baldwin | 345/611 |
| 2003/0016217 A1 | | 1/2003 | Vlachos et al. | |
| 2003/0214506 A1 | * | 11/2003 | Koselj et al. | 345/519 |
| 2004/0001069 A1 | * | 1/2004 | Snyder et al. | 345/582 |
| 2004/0104915 A1 | | 6/2004 | Mori | |
| 2005/0212806 A1 | * | 9/2005 | Koselj et al. | 345/522 |

(Continued)

FOREIGN PATENT DOCUMENTS

| | | |
|---|---|---|
| CN | 1653487 A | 8/2005 |
| CN | 101065784 A | 10/2007 |
| CN | 101093578 A | 12/2007 |

OTHER PUBLICATIONS

Don P. Mitchell, "Generating Antialiased Images at Low Sampling Densities," Published Date: 1987, http://www.mentallandscape.com/Papers_siggraph87.pdf.

(Continued)

*Primary Examiner* — Stephen R Koziol
*Assistant Examiner* — Jason Pringle-Parker
(74) *Attorney, Agent, or Firm* — Bryan Webster; Kate Drakos; Micky Minhas

(57) ABSTRACT

Methods, systems, and computer-storage media for target independent rasterization of an image. The target is the memory allocated for a rendered image within a graphics pipeline. Embodiments of the present invention allow the rasterization process's sampling rate to be specified independently from the memory allocated for the rendered image. Embodiments of the present invention also allow the rasterization process to be executed at a rate that does not correspond to the memory allocated for the rendered target.

20 Claims, 6 Drawing Sheets

(56) References Cited

U.S. PATENT DOCUMENTS

| | | |
|---|---|---|
| 2006/0250407 A1* | 11/2006 | Xu .................................. 345/582 |
| 2007/0018988 A1 | 1/2007 | Guthe |
| 2007/0071312 A1* | 3/2007 | Gardella et al. .............. 382/154 |
| 2007/0296725 A1 | 12/2007 | Steiner et al. |
| 2008/0118148 A1* | 5/2008 | Jiao et al. ..................... 382/173 |
| 2008/0284780 A1* | 11/2008 | Hsu ................................ 345/422 |
| 2009/0141038 A1 | 6/2009 | Newaskar et al. |
| 2009/0256848 A1* | 10/2009 | Iourcha et al. ................ 345/522 |
| 2009/0303245 A1* | 12/2009 | Soupikov et al. ............. 345/582 |
| 2010/0002000 A1* | 1/2010 | Everitt et al. ................. 345/426 |
| 2010/0008575 A1 | 1/2010 | Ouyang et al. |
| 2010/0110102 A1* | 5/2010 | Nystad et al. ................. 345/611 |
| 2010/0164955 A1 | 7/2010 | Sathe et al. |
| 2010/0164983 A1* | 7/2010 | Lawrence et al. ............. 345/611 |
| 2010/0283793 A1* | 11/2010 | Cameron et al. .............. 345/590 |
| 2011/0063294 A1* | 3/2011 | Brown et al. ................. 345/423 |
| 2011/0090228 A1* | 4/2011 | Persson ........................ 345/443 |
| 2011/0249011 A1* | 10/2011 | Lalonde et al. ............... 345/522 |
| 2011/0285736 A1 | 11/2011 | Kilgard |
| 2011/0285742 A1 | 11/2011 | Kilgard et al. |
| 2011/0285747 A1 | 11/2011 | Kilgard |
| 2011/0310102 A1 | 12/2011 | Chang |
| 2012/0086715 A1 | 4/2012 | Patel et al. |

OTHER PUBLICATIONS

John Amanatides, "Algorithms for the Detection and Elimination of Specular Aliasing," Published Date: 1992, http://citeseerx.ist.psu.edu/viewdoc/summary?doi=10.1.1.42.5363.

International Search Report and Written Opinion of the International Searching Authority, in PCT/US2013/061069 mailed Nov. 21, 2013, 13 pages.

Segal, et al., "Chapter 11: Programmable Vertex Processing", In the OpenGL Graphics System: A Specification (Version 4.3 (Core Profile)), Aug. 6, 2012, 50 pages.

Ni, et al., "Efficient Substitutes for Subdivision Surfaces", In ACM SIGGRAPH Courses, Aug. 5, 2009, 107 pages.

"GPU Experiments: Tessellation Example", Published on: Feb. 19, 2010, Available at: http://gpuexperiments.blogspot.de/2010/02/tessellation-example.html.

Second Office Action and Search Report Issued in Chinese Patent Application No. 201110297144.4, Mailed Date: Sep. 22, 2014, 18 Pages.

"Third Office Action Issued in Chinese Patent Application No. 201110297144.4", Mailed Date: Mar. 30, 2015, 16 Pages.

Non-Final Office Action dated May 20, 2015 in U.S. Appl. No. 13/873,403, 41 pages.

* cited by examiner

TARGET INDEPENDENT RASTERIZATION

BACKGROUND

Rasterizing is a process, often described as a graphics pipeline, that converts scene data into a rendered image where each pixel (picture element) in an image is assigned a color based on data passed through the graphics pipeline. The rasterizing process may sample the scene data multiple times per pixel to improve the accuracy of the color assigned to each pixel. For example, at a sampling rate of four, the rasterizing process will assign a color to four sub-pixels within each pixel. Subsequent steps in the graphics pipeline use the colors assigned to the four sub-pixels to calculate a single color for the pixel. Sampling at greater than one sample per pixel helps smooth the appearance of non-vertical and non-horizontal lines on a display; however, this incurs the cost of additional processing time and resource usage. This smoothing process is often referred to as antialiasing.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention relate generally to target independent rasterization. The target is the memory allocated for a rendered image. Embodiments of the present invention allow the rasterization process's sampling rate to be specified independently from the memory allocated for the rendered image. Embodiments of the present invention also allow the rasterization process to be executed at a rate that does not correspond to the memory allocated for the rendered target. For example, embodiments of the present invention allow a sampling rate of 4 times per pixel during rasterization of the image and a memory allocation needed to store one color per pixel in the image, rather than 4 times the pixels in the image, as would be used if the target and sampling rate corresponded with each other.

BRIEF DESCRIPTION OF THE DRAWINGS

Embodiments of the invention are described in detail below with reference to the attached drawing figures, wherein.

DETAILED DESCRIPTION

Figure 1:
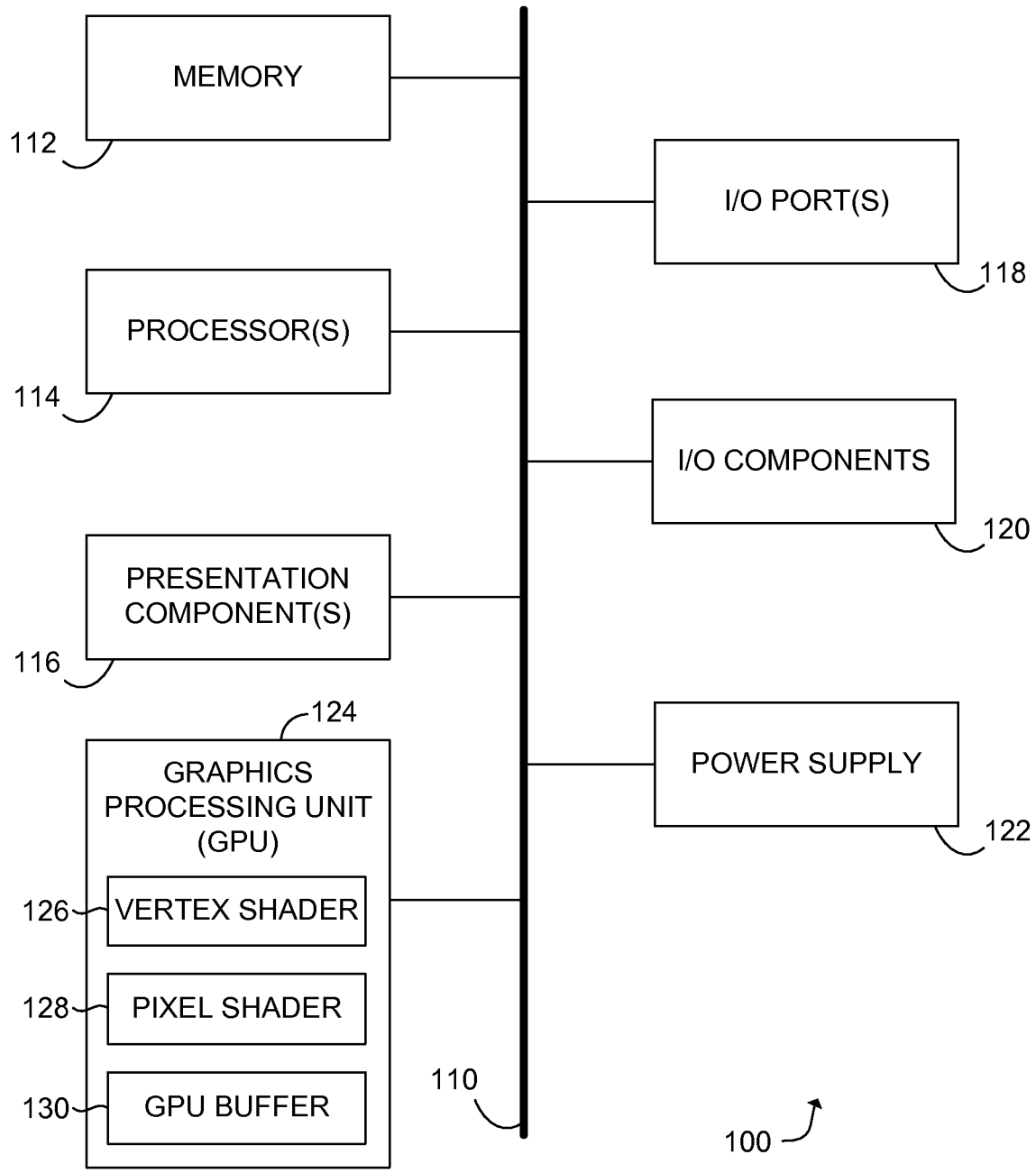
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate generally to target independent rasterization. The target is the memory allocated for a rendered image. Embodiments of the present invention allow the rasterization process's sampling rate to be specified independently from the memory allocated for the rendered image. Embodiments of the present invention also allow the rasterization process to be executed at a rate that does not correspond to the memory allocated for the rendered target. For example, embodiments of the present invention allow a sampling rate of 4 times per pixel during rasterization of the image and a memory allocation needed to store one color per pixel in the image, rather than 4 times the pixels in the image, as would be used if the target and sampling rate corresponded with each other.

Elements of the graphics pipeline are configured to perform embodiments of the present invention through an Application Program Interface (API) that allows the target memory allocation and sampling rate to be specified separately. Once the sampling rate and target memory are specified, other components in the graphics pipeline are configured to process scene data into a rendered image using the sampling rate and memory allocation. These configuration details are described in more detail subsequently.

In one aspect, a method of rendering antialiased two-dimensional graphics is provided. The method comprises converting scene data into an input coverage mask by generating a set of geometric shapes tessellated from objects in the scene data. The method comprises generating a first instruction to define a render-target storage value in a graphics pipeline. The method also comprises generating a second instruction to define a sampling rate for a rasterizer in the graphics pipeline. The sampling rate is defined independently from the render-target storage value. The method also comprises generating a third instruction to configure a pixel shader to process the input coverage mask through the graphics pipeline. The method also comprises communicating the input coverage mask to the graphics pipeline.

In another aspect, a method of instructing a graphic processing unit to perform target independent rasterization. The method comprises receiving a first instruction to define a render-target storage value in a graphics pipeline running in a graphical processing unit. The method also comprises allocating, through a computing device, an amount of memory in the graphical processing unit corresponding to the render-target storage value. The method comprises receiving a second instruction to define a sampling rate for a rasterizer in the graphics pipeline in the graphical processing unit. The sampling rate is defined independently from the render-target storage value. The method also comprises configuring, through the computing device, the rasterizer to sample scene data at the sampling rate.

In another aspect, a computer-readable storage medium storing an application program interface (API) for controlling a graphical processing unit (GPU) is provided. The API comprises a render-target storage property that defines an amount of memory allocated on the GPU to a rendered image. The API also comprises a sampling-rate property that defines a sampling rate used by a rasterizer component.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, and a graphical processing unit (GPU) 124. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, CPUs and GPUs have memory. The diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. Computer-storage media may comprise Random Access Memory (RAM); Read Only Memory (ROM); Electronically Erasable Programmable Read Only Memory (EEPROM); flash memory; Compact Disk Read-Only Memory (CDROM), digital versatile disks (DVDs) or other optical or holographic media; magnetic cassettes, magnetic tape, magnetic disk storage or other magnetic storage devices.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Components of the computing device 100 may be used in image processing. For example, the computing device 100 may be used to implement a graphics pipeline, similar to graphics pipeline 300 of FIG. 3, that processes and applies various effects and adjustments to a raw image. Graphic pipelines include a series of operations that are performed on a digital image. These pipelines are generally designed to allow efficient processing of a digital image, while taking advantage of available hardware.

To implement a graphics pipeline, one or more procedural shaders on the GPU 124 are utilized. Procedural shaders are specialized processing subunits of the GPU 124 for performing specialized operations on graphics data. An example of a procedural shader is a vertex shader 126, which generally operates on vertices. For instance, the vertex shader 126 can apply computations of positions, colors and texturing coordinates to individual vertices. The vertex shader 126 may perform either fixed or programmable function computations on streams of vertices specified in the memory of the graphics pipeline. Another example of a procedural shader is a pixel shader 128. For instance, the outputs of the vertex shader 126 can be passed to the pixel shader 128, which in turn operates on each individual pixel. After a procedural shader concludes its operations, the information may be placed in a GPU buffer 130. The information may be presented on an attached display device or may be sent back to the host for further operations.

The GPU buffer 130 provides a storage location on the GPU 124 where an image may be stored. As various image processing operations are performed with respect to an image, the image may be accessed from the GPU buffer 130, altered, and then re-stored on the buffer 130. The GPU buffer 130 allows the image being processed to remain on the GPU 124 while it is transformed by a graphics pipeline. As it is time-consuming to transfer an image from the GPU 124 to the memory 112, it may be preferable for an image to remain on the GPU buffer 130 until processing operations are completed.

With respect to the pixel shader 128, specialized pixel shading functionality can be achieved by downloading instructions to the pixel shader 128. Furthermore, the functionality of many different operations may be provided by instruction sets tailored to the pixel shader 128 and other components such as a rasterizer. For example, negating, remapping, biasing, and other functionality are useful for many graphics applications. The ability to program the pixel shader 128 is advantageous for graphics operations, and specialized sets of instructions may add value by easing development and improving performance. By executing these instructions, a variety of functions can be performed by the pixel shader 128, assuming the instruction count limit and other hardware limitations of the pixel shader 128 are not exceeded. The pixel shader 128 and other components may receive instructions through on or more application program interfaces.

Figure 2:
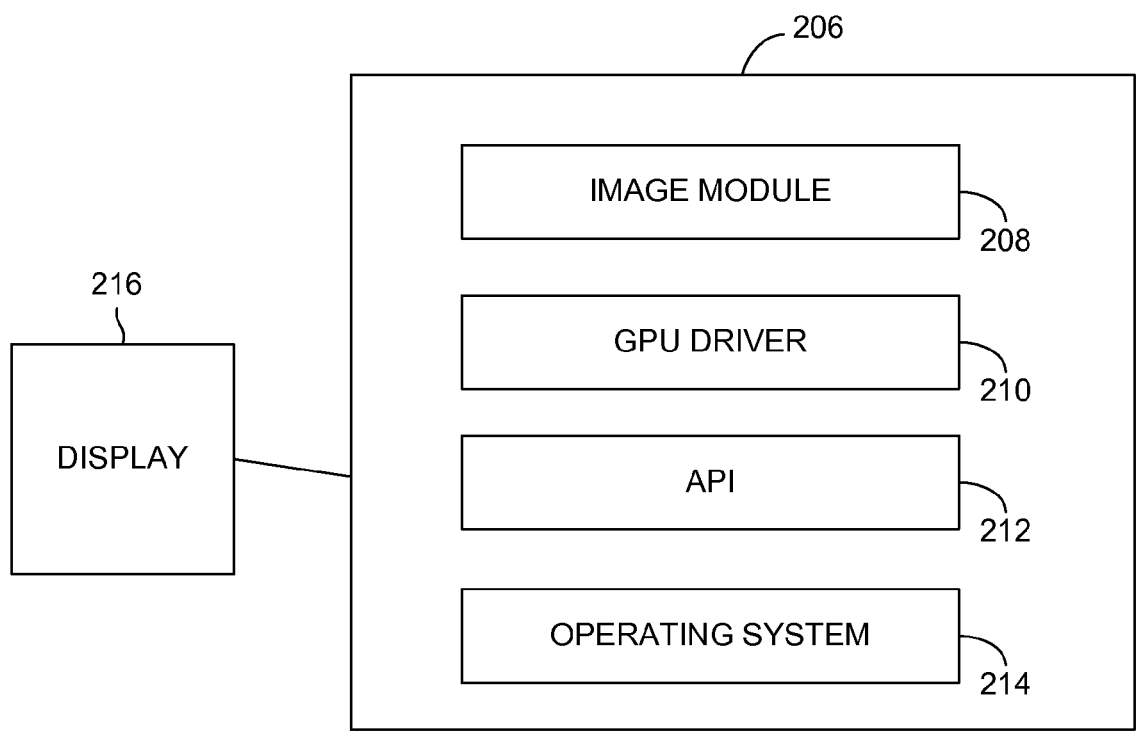
FIG. 2 is a block diagram of an exemplary computing system architecture suitable for use in implementing embodiments of the present invention.

As previously set forth, embodiments of the present invention relate to computing systems for target independent rasterization. With reference to FIG. 2, a block diagram is illustrated that shows an exemplary computing system architecture 200 suitable for use with target independent rasterization. The computing system architecture 200 shown in FIG. 2 is merely an example of one suitable computing system and does not limit the scope of use or functionality of the present invention. Neither should the computing system architecture 200 be interpreted as having any dependency or requirement related to any single module/component or combination of modules/components.

Computing system architecture 200 includes computing device 206 and display 216. Computing device 206 comprises an image module 208, a GPU driver 210, API module 212 and operating system 214. Computing device 206 may be any type of computing device, such as, for example, computing device 100 described above with reference to FIG. 1. By way of example only and not limitation, computing device 206 may be a personal computer, desktop computer, laptop computer, handheld device, mobile handset, consumer electronic device, or the like.

Image module 208 transmits data for an image or scene to be rendered. Image module 208 may be a computer program for which images or scenes are to be rendered. The images or scenarios to be rendered may include, but are not limited to, video game images, video clips, movie images, and static screen images. The images may be three dimensional or two dimensional. Application programming interface (API) module 212 is an interface, that may be provided by operating system 214, to support requests made by computer programs, such as image module 208. Direct3D® and OpenGL® are examples of APIs that support requests of image module 208. Device 206 is in communication with display device 216.

The image module 208 may provide configuration instructions for one or more components in a graphics pipeline. The instructions may also be provided by the operating system 214. The instructions may be passed to API 212, which exposes functions of the GPU drivers to the image module 208. The API 212 may configure functions in the GPU drivers based on the instructions received. As explained in more detail subsequently, the API 212 has a first function to set the target memory for a scene or image processed in the GPU. The API 212 has a separate function to set the sampling rate for a rasterizer component in the GPU. The sampling rate and target memory may be set independent of each other. The image module 208 may provide instructions for these functions on a per frame basis or change these functions multiple times while rendering a single scene or image.

Figure 3:
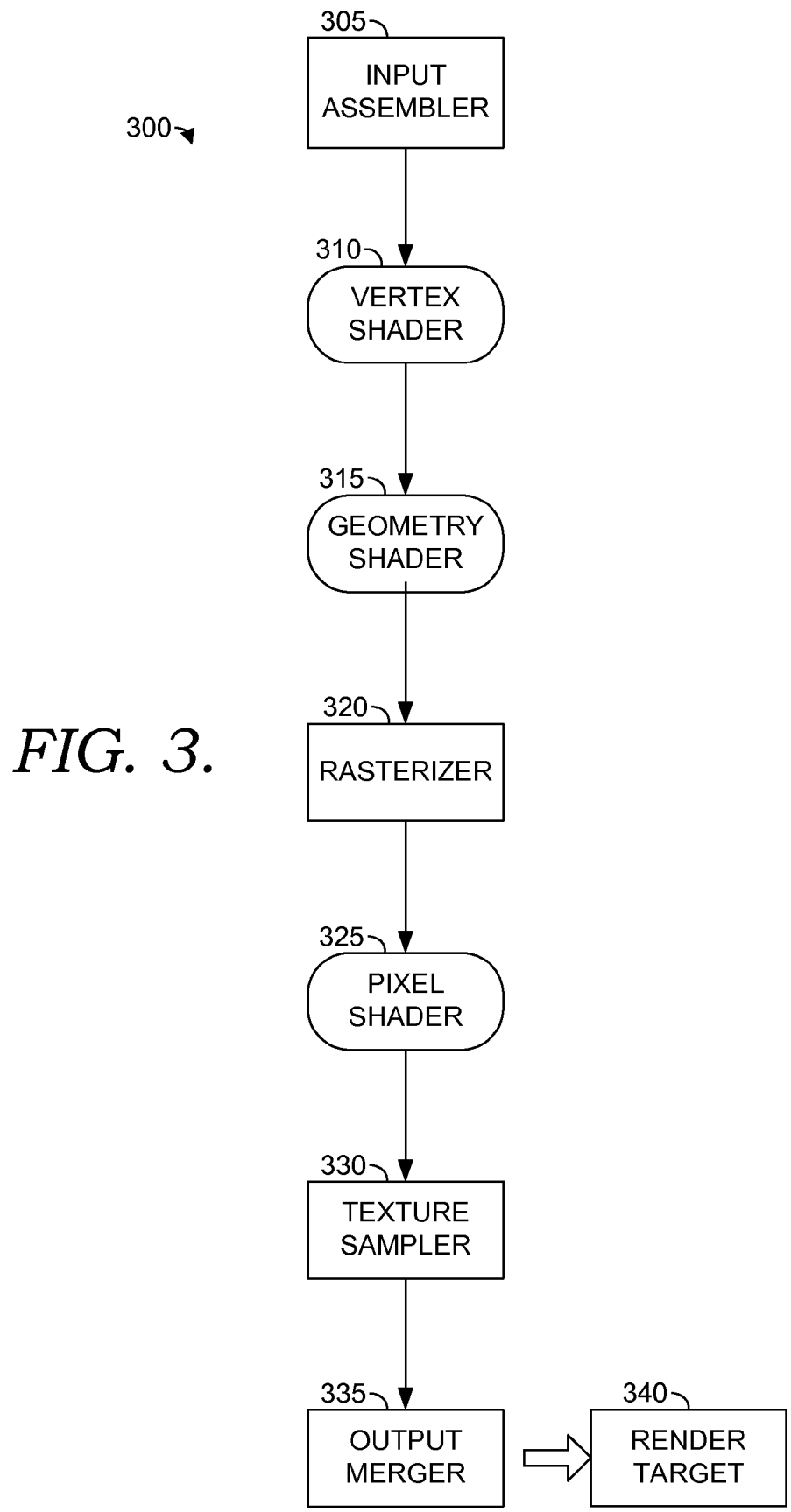
FIG. 3 is a diagram of a graphics pipeline for use with target independent rasterization, in accordance with an embodiment of the present invention.

With reference to FIG. 3, an exemplary graphics pipeline 300 is shown. The graphics pipeline includes the stages for transforming data into images that may be displayed on a display device. The graphics pipeline 300 includes an input assembler 305, vertex shader 310, geometry shader 315, rasterizer 320, pixel shader 325, texture sample 330, and out put merger 335. The image produced by the graphics pipeline may written to a render target 340. The graphics pipeline depicted in FIG. 3 is exemplary, and additional components may be added or components removed.

Input assembler 305 reads vertices out of memory and forms geometry and creates pipeline work items. Vertex shader 310 is a graphics processing function used to add special effects to objects in a 3D environment by performing mathematical operations on the objects' vertex data. Geometry shader 315 generates new graphics primitives, such as points, lines, and triangles, from those primitives that were sent to the beginning of the graphics pipeline. Rasterizer 320 converts scene data into a raster image (e.g. pixels) for output to a display or file. The rasterizer 320 may sample the scene data a several sub-pixels per pixel. Pixel shader 325 serves to manipulate a pixel color, usually to apply an effect on an image, for example; realism, bump mapping, shadows, anti-aliasing, and explosion effects. It is a graphics function that calculates effects on a per-pixel basis. The texture sampler 330 is utilized by the vertex shader 310, geometry shader 315, and pixel shader 325 to fetch data from memory. The texture sampler 330 can perform texture filtering operations, texture addressing modes such as clamp or wrap, convert between different format on reads and select multum in parvo (MIP) levels based on level of detail (LOD) values. Output merger 335 performs blend, depth and stencil operations. The image produced by the output merge 335 is written to the render target 340.

Figure 4:
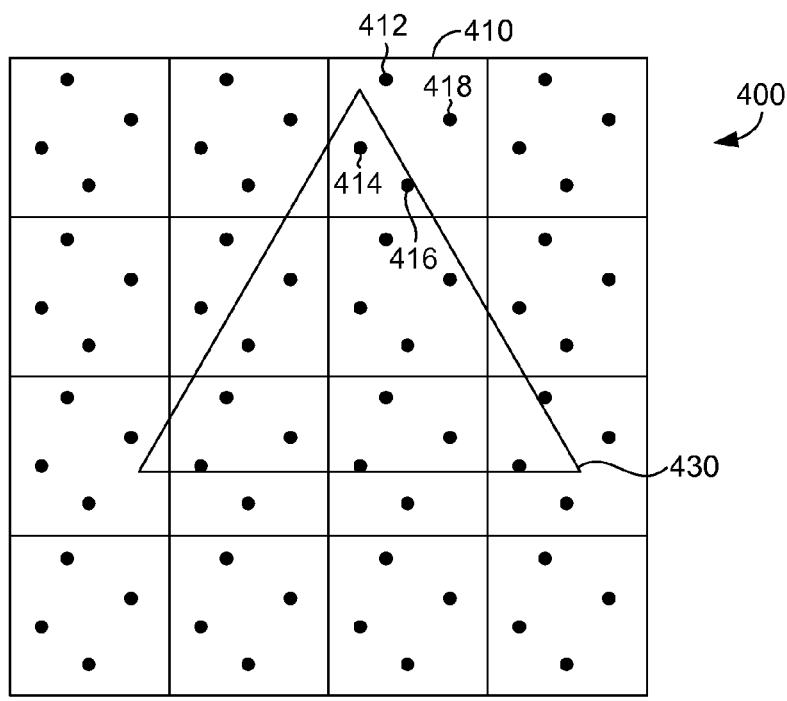
FIG. 4 is an illustration of a rasterization operation, in accordance with an embodiment of the present invention.

Turning now to FIG. 4, an illustration of a rasterization operation is shown, in accordance with an embodiment of the present invention. Only a portion of a scene 400 is shown for illustration purposes. Each box represents a pixel. The dots represent sub-pixels. The scene 400 is sampled four times per pixel, hence four dots per pixel. Initially, geometric shapes, such as triangle 430, are identified in the scene data. All sub-pixels within a geometric shape are assigned the same color. For example, sub-pixels 414 and 416 are assigned the same color. Sub-pixels 412 and 418 may be assigned different colors based on analysis of the scene data. A color is assigned to each sub-pixel in the rasterizing process.

Figure 5:
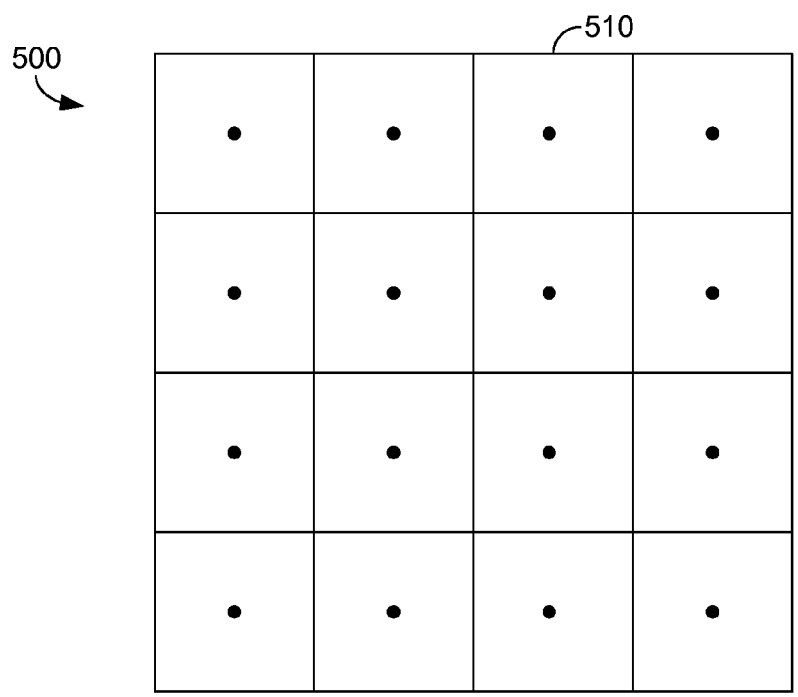
FIG. 5 is an illustration of a rendered image produced by a shading operation, in accordance with an embodiment of the present invention.

Turning now to FIG. 5, a rendered image 500 produced by a shading operation is illustrated, according to an embodiment of the present invention. The rendered image 500 includes pixels, such as pixel 510, that are represented by squares and dots. The rendered image 500 has one color per pixel. Accordingly, the storage for the rendered image only requires enough memory to store one color per pixel. The actual memory required will vary depending on the size of the image. A shader combines the colors assigned to sub-pixels in the rasterizing process to assign a single color to the pixel. For example, the color assigned to pixel 510 is calculated by combining the colors in sub-pixels 512, 514, 516, and 518.

Figure 6:
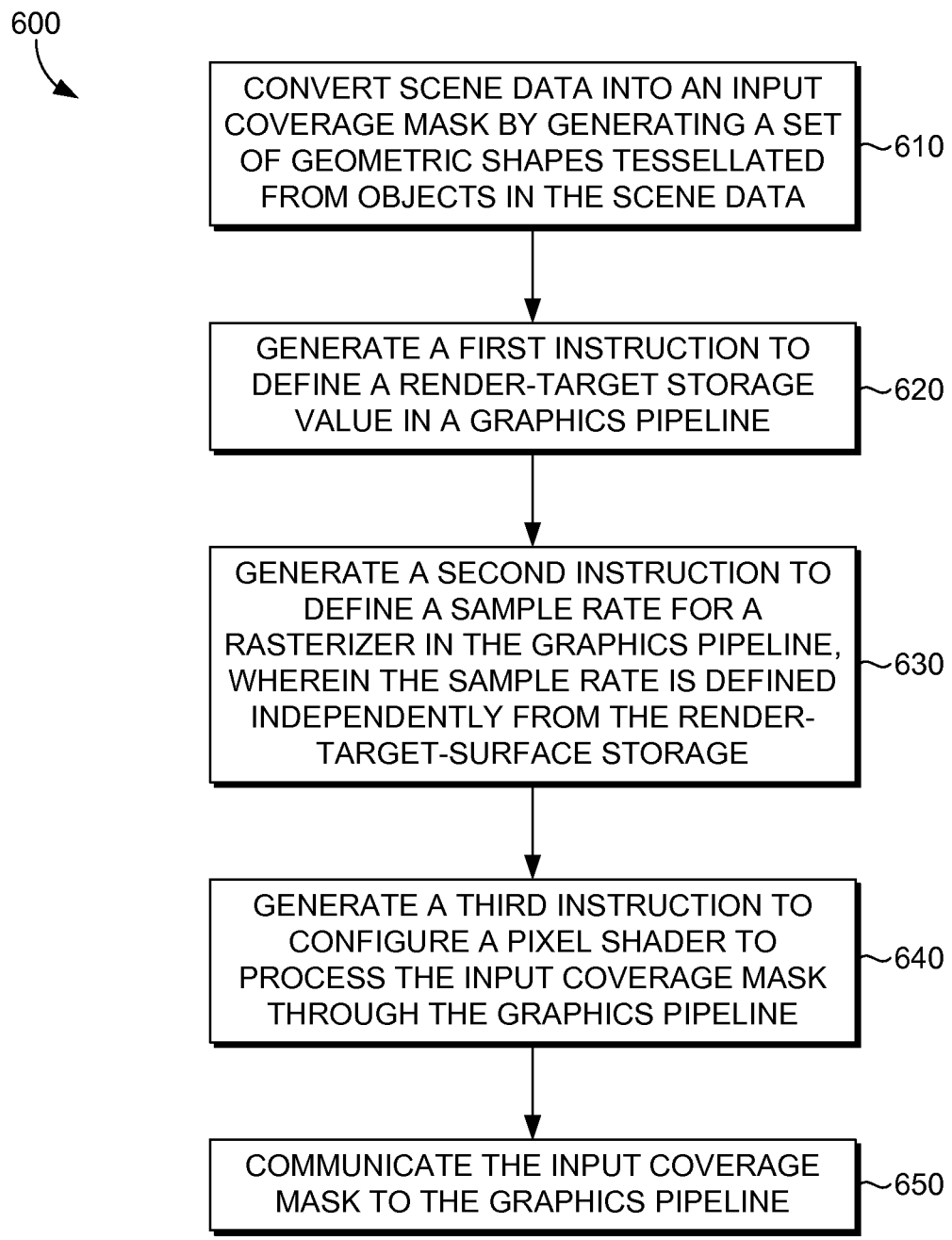
FIG. 6 is a flow chart showing a method of rendering antialiased two-dimensional graphics, in accordance with an embodiment of the present invention.

Turning now to FIG. 6, a method 600 of rendering anti-aliased two-dimensional graphics is described, in accordance with an embodiment of the present invention. Antialiased graphics are rendered images with diagonal lines that appear straight or smooth, rather than stair-stepped. The antialiased images are produced by an anti-aliasing process that utilizes multiple components, such as a rasterizer and a pixel shader. Examples of two-dimensional graphics include charts, spreadsheets, tasks, e-mails, text, and documents. Rendering is a process of generating an image from a data structure. A rendered image does not actually have to be displayed for the completion of the rendering process. Method 600 may be performed by an image component. Examples of image components include word processing applications, spreadsheet applications, presentation applications, personal contact applications, games, and other applications that produce two-dimensional images.

At step 610, scene data is converted into an input coverage mask by generating a set of geometric shapes tessellated from objects in the scene data. In one embodiment, the geometric shapes are triangles. The triangles could be overlapping or nonoverlapping. Concave shapes within the scene data may result in overlapping geometric shapes. The scene data may be converted as part of a process in a graphics pipeline run on a GPU. In another embodiment, the converting step is done by software running on a CPU.

At step 620, a first instruction to define a render-target storage value in a graphics pipeline is generated. The render-target storage value defines the amount of memory allocated to the rendered image. The rendered image may be the end result of running the image through the graphics pipeline. The first instruction may be communicated to an API that in turn configures a process on the GPU. The first instruction may be communicated to a first API that in turn communicates an instruction to a second API.

At step 630, a second instruction to define a sampling rate for a rasterizer in the graphics pipeline is generated. A sampling rate is defined independently from the render-target storage. Because these items are defined separately, their values do not need to be tied together. In one embodiment, the memory, or render-target storage value is set to 1× the rendered image. For example, if the rendered image was 480 pixels×480 pixels, the allocated memory could be enough to store 230,400 pixels. Since the sampling rate is defined independently, the sampling rate could be four sub-pixels per pixel even with the memory allocation for 230,400 pixels on a 480×480 rendered image.

At step 640, a third instruction to configure a pixel shader to process the input coverage mask through the graphics pipeline is generated. The third instruction may vary depending on whether the geometric shapes within the input coverage mask overlap or are non-overlapping. In a scenario where the geometric shapes are nonoverlapping, the pixel shader is configured to count a number of bit sets in the input coverage mask, normalize the results to a real number, and add the real number to current contents of a render target. On the other hand, when there is overlap between the geometric shapes, the pixel shader is configured to combine the input coverage mask with current contents of a render target using a logical process to determine which color is added or subtracted from the render target. In one embodiment, the logical process is a bitmap exclusive-or (XOR) operation. In another embodiment, the logical process is a bitmap OR operation.

Figure 7:
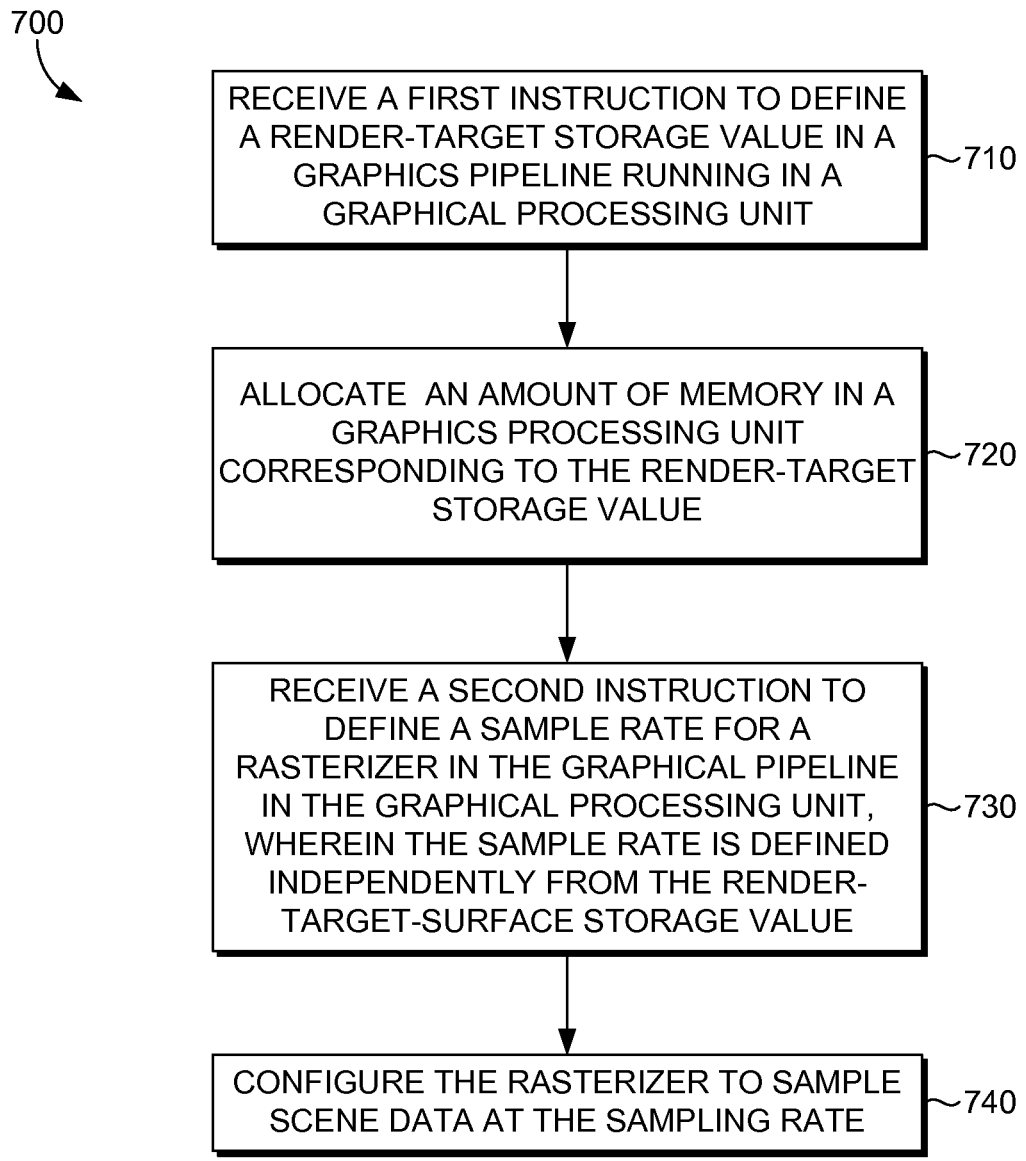
FIG. 7 is a flow chart showing a method of instructing a graphics-processing unit to perform target independent rasterization, in accordance with an embodiment of the present invention.

Turning now to FIG. 7, a method 700 of instructing a graphics-processing unit to perform target independent rasterization is described, in accordance with an embodiment of the present invention. Method 700 may be performed by an application program interface. Examples of application program interfaces that may perform method 700 include Direct3D® and OpenGL®.

At step 710, a first instruction to define a render-target storage value in a graphics pipeline running on a graphical processing unit is received. The instruction may be received from a program. At step 720, an amount of memory in a graphical processing unit is corresponding to the render-target storage value is allocated. The memory may be allocated by a driver for the graphical processing unit.

At step 730, a second instruction to define a sampling rate for a rasterizer in the graphics pipeline on the graphical processing unit is received. The sampling rate is defined independently from the render-target storage value. At step 740, the rasterizer is configured to sample scene data at the sampling rate. The rasterizer may be configured through drivers in the graphical processing unit. As described previously with reference to method 600, the sampling rate and storage value may be independent of each other.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computer-storage device having computer-executable instructions embodied thereon for performing a method of rendering antialiased two-dimensional graphics, the method comprising:
   converting scene data into an input coverage mask by generating a set of geometric shapes tessellated from objects in the scene data;
   receiving, by an application program interface (API), a first instruction that defines a render-target storage value in a graphics pipeline, wherein the render-target storage value is an amount of memory allocated to a rendered image;
   receiving, by the API, a second instruction that defines the sampling rate for a rasterizer in the graphics pipeline, wherein the sampling rate is defined by the second instruction independently from the render-target storage value and the render-target storage value is defined by the first instruction independently from the sampling rate, and wherein the sampling rate defines a number of sub-pixels that the rasterizer assigns colors;
   receiving a third instruction to configure a pixel shader to process the input coverage mask through the graphics pipeline based on the amount of memory allocated and the number of sub-pixels that the rasterizer assigns colors, wherein the pixel shader and an alpha blender are configured to count a number of bit sets in the input coverage mask, normalize the results to a real number, and add the real number to current contents of a render target;
   wherein at least the first and second instructions comprise configuration instructions for one or more components in the graphics pipeline; and
   communicating the input coverage mask to the graphics pipeline.

2. The device of claim 1, wherein the method further comprises receiving rendered scene data from the graphics pipeline.

3. The device of claim 1, wherein the method further comprises:
   setting, by a first function of the API, the render-target storage value as the amount of memory allocated to the rendered image based on the first instruction that is received from a computer program for which the image is to be rendered; and
   setting, by a second function of the API, the sampling rate for the rasterizer as the number of sub-pixels that the rasterizer assigns colors based on the second instruction that is received from the computer program.

4. The device of claim 1, wherein the render-target storage value is defined to be one times a screen size, and wherein the sampling rate is set to a value greater than 1 sub-pixel per pixel.

5. The device of claim 1, wherein the pixel shader and an alpha blender are configured to count a number of bit sets in the input coverage mask, normalize results to a real number, and add the real number to current contents of a render target when there is no overlap between the set of geometric shapes.

6. The device of claim 1, wherein, when there is overlap between the set of geometric shapes, the pixel shader and an alpha blender are configured to combine the input coverage mask with current contents of a render target using a logical process to determine which colors are added or subtracted from the render target.

7. The device of claim 6, wherein the logical process is one of a bitmap exclusive-or (XOR) operation and a bitmap OR operation.

8. The device of claim 1, wherein the render-target storage value is equivalent to one pixel per pixel in a rendered image and the sampling rate is set to 4 sub-pixels per pixel.

9. The device of claim 1, configuring, by the API, functions in at least one GPU driver based on the first and second instructions.

10. A method of instructing a graphic processing unit to perform target independent rasterization, the method comprising:
   receiving a first instruction that defines a render-target storage value in a graphics pipeline running in a graphical processing unit, wherein the render-target storage value is defined by the first instruction independently from a sampling rate;
   receiving a second instruction that defines the sampling rate for a rasterizer in the graphics pipeline in the graphical processing unit, wherein the sampling rate is defined independently from the render-target storage value and the sampling rate defines a number of sub-pixels that the rasterizer assigns colors in the rendering of the image; and
   configuring a pixel shader to process an input coverage mask through the graphics pipeline based on the amount of memory allocated and the number of sub-pixels that the rasterizer assigns colors, wherein the pixel shader and an alpha blender are configured to count a number of bit sets in the input coverage mask, normalize results to a real number, and add the real number to current contents of a render target;
   wherein at least the first and second instructions comprise configuration instructions for one or more components in the graphics pipeline.

11. The method of claim 10, wherein the the pixel shader and the alpha blender are configured to combine the input coverage mask with the current contents of the render target using a logical process to determine which colors are added or subtracted from the render target.

12. The method of claim 11, wherein the logical process is one of a bitmap exclusive-or (XOR) operation and a bitmap OR operation.

13. The method of claim 10, wherein the pixel shader and the alpha blender are configured to count a number of bit sets in the input coverage mask, normalize results to a real number, and add the real number to current contents of a render target when there is no overlap between a set of geometric shapes tessellated from objects in scene data that was converted into the input coverage mask.

14. The method of claim 10, wherein the sampling rate is greater than the render-target storage value.

15. The method of claim 10, wherein the render-target storage value is equivalent to one pixel per pixel in a rendered image and the sampling rate is set to 4 sub-pixels per pixel.

16. The method of claim 10, wherein the image rendered by the graphics pipeline is a two-dimensional image.

17. A system comprising one or more processors configured to perform a method of instructing a graphic processing unit to perform target independent rasterization, the method comprising:
   receiving a first instruction that defines a render-target storage value in a graphics pipeline running in a graphical processing unit, wherein the render-target storage value is defined by the first instruction independently from a sampling rate;
   receiving a second instruction that defines the sampling rate for a rasterizer in the graphics pipeline in the graphical processing unit, wherein the sampling rate is defined independently from the render-target storage value and the sampling rate defines a number of sub-pixels that the rasterizer assigns colors in the rendering of the image; and
   configuring a pixel shader to process an input coverage mask through the graphics pipeline based on the amount of memory allocated and the number of sub-pixels that the rasterizer assigns colors, wherein the pixel shader and an alpha blender are configured to count a number of bit sets in the input coverage mask, normalize results to a real number, and add the real number to current contents of a render target;
   wherein at least the first and second instructions comprise configuration instructions for one or more components in the graphics pipeline.

18. The system of claim 17, wherein the pixel shader and the alpha blender are configured to combine the input coverage mask with the current contents of the render target using a logical process to determine which colors are added or subtracted from the render target.

19. The system of claim 18, wherein the logical process is one of a bitmap exclusive-or (XOR) operation and a bitmap OR operation.

20. The system of claim 17, wherein the pixel shader and the alpha blender are configured to count a number of bit sets in the input coverage mask, normalize results to a real number, and add the real number to current contents of a render target when there is no overlap between a set of geometric shapes tessellated from objects in scene data that was converted into the input coverage mask.

* * * * *